(12) United States Patent
Schallig et al.

(10) Patent No.: US 8,641,911 B2
(45) Date of Patent: Feb. 4, 2014

(54) LIQUID EXTRACTOR WITH VANES

(75) Inventors: Michiel Allan Aurelius Schallig, Drachten (NL); Theodoor Stolk, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 407 days.

(21) Appl. No.: 12/808,464

(22) PCT Filed: Dec. 17, 2008

(86) PCT No.: PCT/IB2008/055358
§ 371 (c)(1),
(2), (4) Date: Aug. 2, 2010

(87) PCT Pub. No.: WO2009/081333
PCT Pub. Date: Jul. 2, 2009

(65) Prior Publication Data
US 2011/0053752 A1     Mar. 3, 2011

(30) Foreign Application Priority Data

Dec. 19, 2007    (EP) .................................... 07123614

(51) Int. Cl.
*B04B 7/18*    (2006.01)
*A47J 19/02*    (2006.01)

(52) U.S. Cl.
USPC ................... 210/787; 210/360.1; 210/380.1; 99/411; 99/413

(58) Field of Classification Search
USPC ............... 210/360.1, 380.1, 787; 99/411, 413
See application file for complete search history.

(56) References Cited

U.S. PATENT DOCUMENTS 4,506,601 A    3/1985    Ramirez et al.
2006/0225584 A1    10/2006    Horng

FOREIGN PATENT DOCUMENTS

| DE | 8915769 U1 | 5/1991 |
| DE | 19651635 A1 | 6/1998 |
| EP | 0272079 | 6/1988 |
| EP | 1216311 A1 | 6/2002 |
| GB | 936329 A | 9/1963 |
| UA | 16 366 U  * | 8/2006 |
| UA | 16366 U | 8/2006 |
| WO | 2005110173 A1 | 11/2005 |

OTHER PUBLICATIONS

Written Opinion of the International Searching Authority for PCT/IB2008/055358, Jul. 17, 2009.*
PTO 13-3210-Apr. 2013 Translation of UA 16 366 U, UA 16 366 U published Aug. 15, 2006.*

* cited by examiner

*Primary Examiner* — David A Reifsnyder

(57) ABSTRACT

A centrifugal bowl (105) comprises a base (3) that can rotate about an axis of rotation. A filter sieve in the shape of a perforated peripheral side sieve wall (151) extends from an open end to the base, and a plurality of vanes (155*a* . . . 155*f*) is disposed in a predominantly radial direction on the inner surface of the perforated peripheral side sieve wall (151).

8 Claims, 7 Drawing Sheets

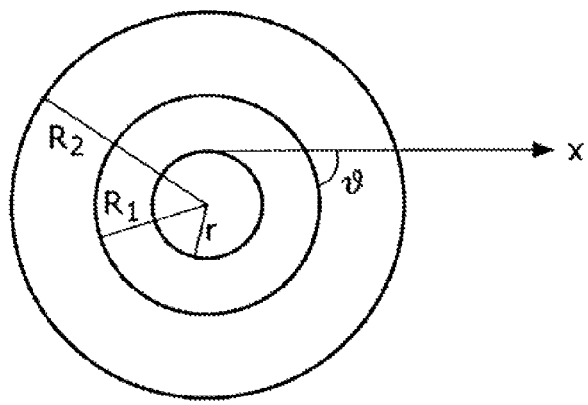
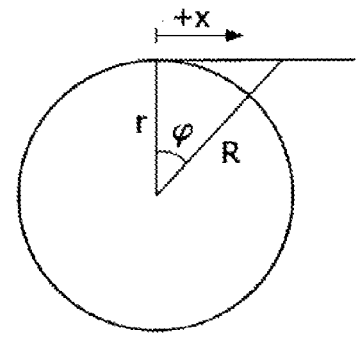
FIG. 3
FIG. 4
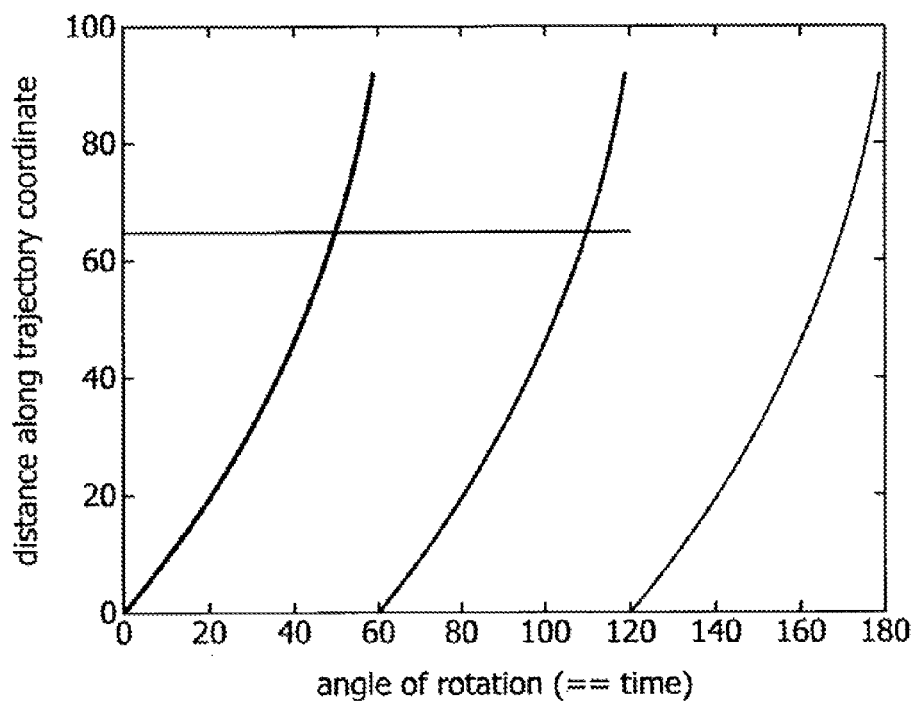
FIG. 5

LIQUID EXTRACTOR WITH VANES

FIELD OF THE INVENTION

The subject matter relates to a device for extracting liquid from solids such as the centrifugal bowl arrangement of a juicer.

BACKGROUND OF THE INVENTION

WO2005110173 discloses a double action sieve for juice extractors. The disclosed double action sieve comprises a cone with a steeper angle put onto the base cone. Such a juicer has a limited juice output.

SUMMARY OF THE INVENTION

It is an object of the invention to provide a centrifugal bowl arrangement that can increase the liquid output. It is a further object of the invention to provide a method to improve the liquid output.

The object of the invention is realized by providing a centrifugal bowl comprising a base that can rotate about an axis of rotation. A filter sieve in the shape of a perforated peripheral side sieve wall extends from an open end to the base and a plurality of vanes is disposed in a predominantly radial direction on the inner surface of the perforated peripheral side sieve wall. The disclosed centrifugal bowl increases the separation efficiency by positively applying the rotational speed, which in turn increases the liquid output.

In one embodiment of the invention, the shape of the vanes is triangular and more or less fills the space between a feeding tube and the perforated peripheral side sieve wall. The shape of the vane is selected base on the directions of the perforated peripheral sieve wall and the feeding tube. The triangular shape of the vanes improves catching efficiency.

In a further embodiment of the invention, the number of vanes is six. There is a relation between the number of vanes, the size of the vanes, the vertical dispersion behavior and the catching efficiency. The inventors have found that six vanes results in good catching efficiency thereby increasing the juicer output.

In a still further embodiment of the invention, the vanes are disposed such that there is no leakage between the perforated peripheral side sieve wall and the vane. This ensures that solids are retained within the centrifugal bowl. This minimizes the loss due to leakage and increases the liquid output.

In a still further embodiment of the invention, the base is dome shaped having cutting teeth disposed on the inner side of the domed construction. The domed construction generates a vertically more dispersed pattern of pulp and juice mixture and hence increases the juice output.

According to the further object of the invention, a method of improving the juice output of a juicer is disclosed. The juicer has a centrifugal bowl with a base that can rotate about an axis of rotation. A filter sieve in the shape of a perforated peripheral side sieve wall extends from an open end to the base. The method of improving the liquid output comprises the step of preventing the slippage of both fluid and solids in the tangential direction.

In an embodiment of the method, preventing the slippage of both fluid and solids in the tangential direction comprises the step of providing a plurality of vanes in a predominantly radial direction on the inner surface of the perforated peripheral side sieve wall. The vanes give rise to a coriolis effect, wherein a particle moving in rotating frame of reference experiences the coriolis force acting perpendicular to the direction of motion and to the axis of rotation. The vanes increase the centrifugal forces thereby enhancing the juice output.

BRIEF DESCRIPTION OF THE DRAWINGS

The above-mentioned aspects, features and advantages will be further described, by way of example only, with reference to the accompanying drawings, in which the same reference numerals indicate identical or similar parts, and in which:

FIG. 3 and FIG. 4 schematically illustrate general geometry of a path a particle takes in the rotating centrifugal bowl;

FIG. 5 schematically illustrates a time-place diagram;

FIG. 10 schematically illustrate the fraction of particles caught and the fraction of particles escaped; and.

DETAILED DESCRIPTION OF EMBODIMENTS

Figure 1:
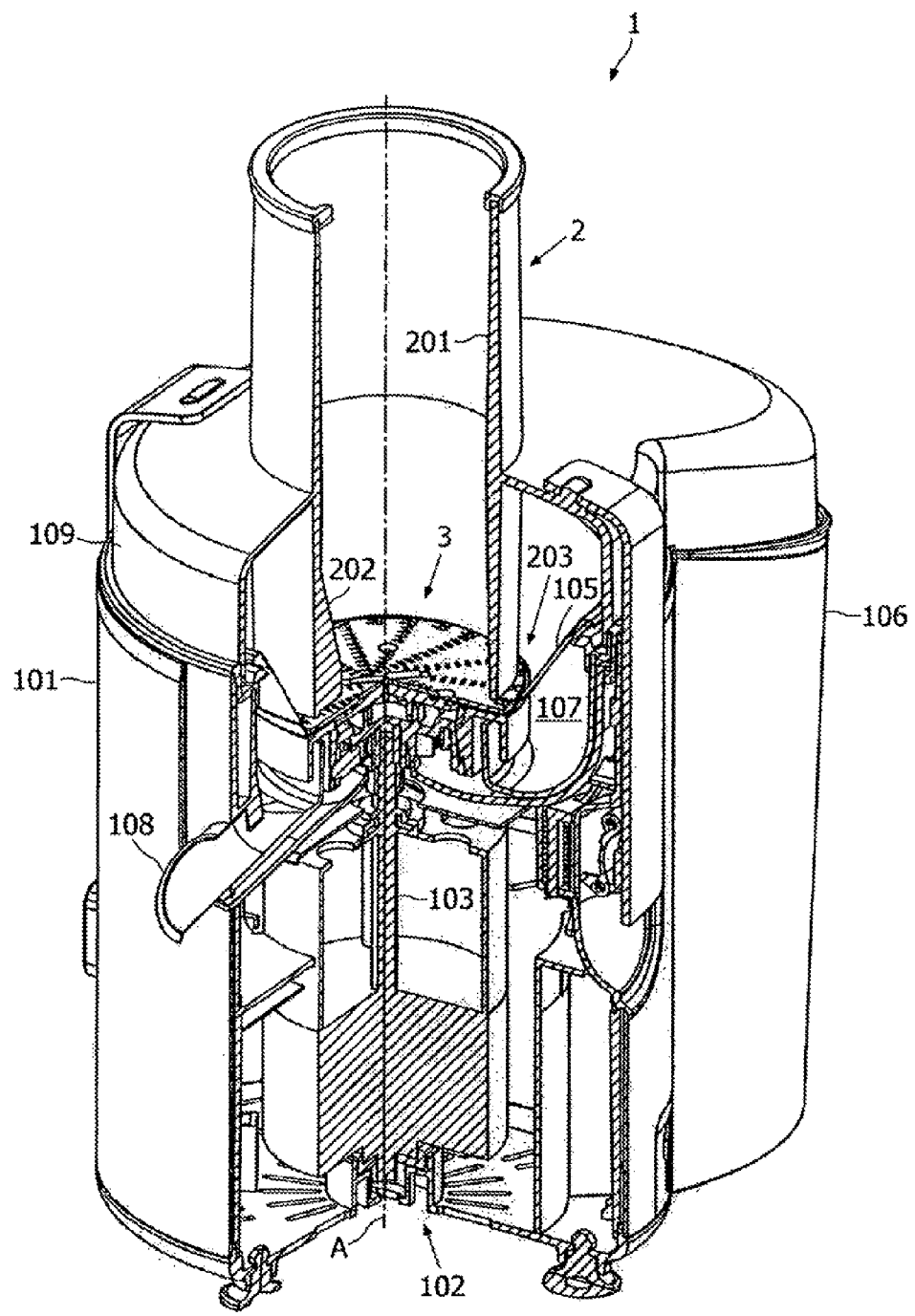
FIG. 1 illustrates an exemplary juicer in a partially cut view.

Referring now to FIG. 1, a juicer arrangement 1 is generally provided in the form of a motor driven domestic appliance capable of extracting the juice from fruits (orange, lemon, grapefruit), especially citrus fruits, and delivering the juice into a vessel positioned adjacent the main body of the appliance e.g. Juice jug.

A housing 101 accommodates a motor 102 with a driving shaft 103 that can drive a centrifugal bowl 105.

Figure 2:
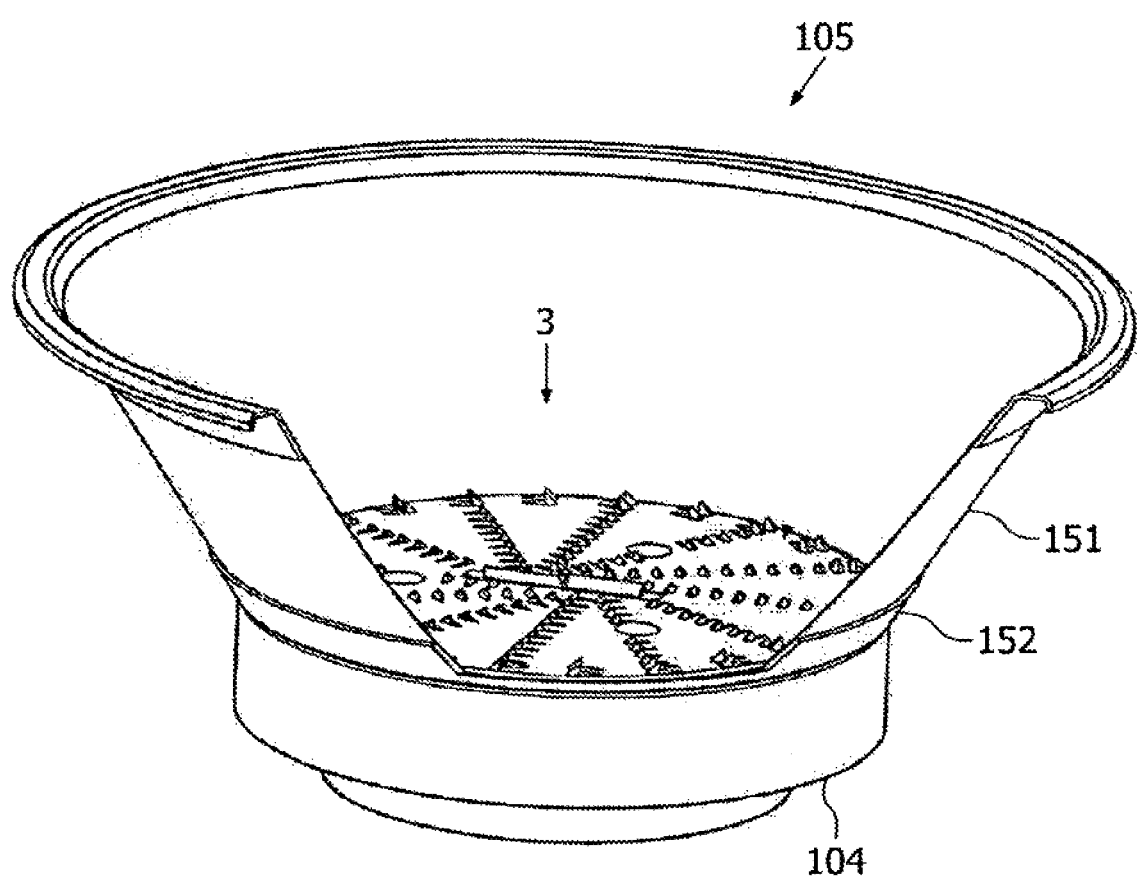
FIG. 2 illustrates an exemplary centrifugal bowl arrangement for the juicer illustrated in FIG. 1.

The centrifugal bowl 105 has a frusto-conical shape (cf. FIG. 2) and consists of:

i) a base 3 that can be mounted on the driving shaft 103 to rotate about an axis of rotation. Cutting teeth are disposed on the inner side of the base, thus forming a grating disk. The diameter of the base is smaller than or equal to the diameter of the open end.

ii) a filter sieve 105 comprising the sieve 151 and the sieve support 152. The filter sieve 105 is in the form of a perforated peripheral side sieve wall extending from the open end to the base. The base 3 and the filter sieve 105 are supported by the holder 104. The holder 104 is arranged in the juicer on the driving shaft 103 so that the centrifugal bowl comprising both the base 3 and the filter sieve 105 can be rotated.

In operation, the base 3 (i.e. the grating disk) grates vegetables and/or fruit, and the juice and the pulp are thrown against the filter sieve 105. The juice drips through the filter sieve 105 and is collected by the juice collector 107, from which it is drained via a spout 108, for example, into a glass/vessel positioned under the juice spout e.g. Juice Jug. The pulp is ejected over the upper edge of the filter sieve 105 and is collected in a pulp container 106.

The housing 101 with motor 102, driving shaft 103, centrifugal bowl, filter sieve 105, juice collector 107 and pulp container 106 is covered by a lid 109. The lid 109 has an inlet piece 2 for feeding fruit, vegetables, etc. into the juicer, i.e. putting them on to the base (i.e. the grating disk). In the example illustrated in FIG. 1, the inlet piece 2 has the form of a feeding tube, the inner opening 203 of which is positioned just over the base (i.e. the grating disk) in order to form an interstice with the base. The inlet piece 2 is dimensioned in such a way that it has a slightly smaller inner radius than the base (i.e. grating disk) of the centrifugal bowl.

Juicers have a certain juice output (i.e. juice per unit weight). The juice output here refers to the ability to retrieve a fraction of juice of all the juice that can be extracted from a certain fruit.

The juice extraction comprises two steps. In a first step, the fruit is grated and in a second step the juice is extracted from the grated material which is normally a mixture of juice and pulp.

The working principle of the disclosed centrifugal bowl is based on the following:
1. Coriolis effect
2. Catching effect
3. Pumping of air effect When fruit or vegetables are introduced into the juicer via the inlet piece 2, for example, by means of a pusher to be introduced into the inlet piece for pushing the fruit or vegetables and to be guided by the protrusion 202, the fruit or vegetable is held by the pusher and the side wall 201 of the inlet piece 2 so as to be grated into bits and pieces (i.e. a mixture of pulp and juice is formed by the grating disk). The bits and pieces are then caused to pass through the interstice by centrifugal forces.

In operation, the mixture of juice and pulp is free to fly from the slit between the feeding tube and the fast spinning base forming a vertically dispersed pattern of the particles (i.e. bits and pieces) containing the juice-pulp mixture. The vertically dispersed pattern of the particles is subject to the centrifugal forces that are generated by the rotating centrifugal bowl. The higher the centrifugal force the better it is.

The vertically dispersed pattern of the flying particles is subject to these centrifugal forces. Due to these centrifugal forces, the flying particles are caught on the perforated peripheral side sieve wall. The juice is separated from the flying particles that are caught on the perforated peripheral side sieve wall (i.e. separating the juice from the pulp-juice mixture). It is noted here that a fraction of the flying particles are caught on the perforated peripheral side sieve wall and some fraction of the flying particles escape without being caught on the perforated peripheral side sieve wall. Due to the decrease in the amount of flying particles being caught on the perforated peripheral side sieve wall, the amount of juice that can be separated from the pulp juice mixture reduces thereby reducing the overall juice output of the juicer. Generally, the separation efficiency has to be high. The separation efficiency here refers to the efficiency of separating the juice from the pulp juice mixture. When the separation efficiency is high, the amount of juice entering into the perforated peripheral side sieve wall can increase. This in turn can increase the juice output.

In operation, the centrifugal bowl rotates. The shredded flying particles are transported along the perforated peripheral side sieve wall. The mesh (small holes on the filter sieve) separates the juice and the fruit fibers. The juice flows through the sieve holes into the juice collector 107. Through the spout the juice flows directly into the juice jug. Further, the solid fibers will spin out directly into the pulp container 106.

The juicers continue to drip when the juicing process has finished. There can be some pulp juice mixture left out on the perforated peripheral side sieve wall which has not been separated well. This pulp juice mixture can have some amount of juice still left out. Generally, the gravitational force pulls out all the remaining juice. Alternately, air can be pumped that can blow the juice completely out of the filter sieve and the juice collector into the Juice Jug.

The inventors have found that it is highly unlikely that the rotational speed of the perforated peripheral side sieve wall is truly imposed on the flying particles. Due to this, some percentage of the particles can slip out and may not be caught on the perforated peripheral side sieve wall.

The disclosed centrifugal bowl makes use of the above mentioned effects, namely:
the coriolis effect wherein the amount of centrifugal forces acting on the flying particles is increased;
the catching effect wherein the amount of flying particles that are caught on the peripheral side sieve wall is increased; and
the pumping of air effect wherein sufficient air is pumped to ensure that the remaining juice left out on the filter sieve and the juice collector is blown completely out into the Juice Jug.

The centrifugal forces are increased by adding vanes on the inner surface of the perforated peripheral side sieve wall. The term vane here refers to a flat surface that rotates and pushes against air or liquid. The vanes give rise to a coriolis effect. The coriolis forces increases the centrifugal forces acting on the flying particles.

Further, the disclosed centrifugal bowl positively applies the rotational speed on the pulp juice mixture. This prevents or decreases slippage of the pulp juice mixture in the rotational direction. This can increase the juice output.

Further, the radial vanes provide sufficient force to blow the juice from the perforated peripheral side sieve wall to the outlet, so as to prevent dripping. The radial vanes also provide additional forces to press the juice (liquid) out of the pulp juice mixture which can increase the separation efficiency.

Further, the catching effect of vanes is an effective approach to counter spray the pulp juice mixture in the vertical direction. The vanes can enhance the catching efficiency which in turn can increase the juice output considerably. The catching efficiency here refers to the percentage of the flying particles that are caught on the perforated peripheral side sieve wall. An analysis of the effect of vanes is described below.

Geometrically, every particle path (i.e. in the rotating centrifugal bowl) can be fully described by a starting radius r, and going tangentially. The radius r can be considerably smaller compared to the radius of a feeding tube when there is a large (apparent) radial component in the velocity. This is illustrated in FIG. 3, wherein r is the trajectory, $R_1$ is the start vane and $R_2$ is the end vane, v is the angle of vane-entrance, which is influenced by r.

The path that the pulp and juice mixture takes between the slit and landing on the filter sieve and its effect on the separation efficiency is important and can be characterized with several parameters namely
V: velocity;
R: radius;
α: angle between the horizontal plane and the trajectory.

Along the trajectory of the particle, a co-ordinate x is defined, as illustrated in FIG. 4. From FIG. 4, it can be seen that:

$$x(t)=r*\tan(\Phi(t))$$

$$\Phi(t)=\omega t$$

$$x=\sqrt{R^2-r^2}$$

A time-place diagram for occurrences on the x co-ordinate is illustrated in FIG. 5. The horizontal axis represents the time and the vertical axis represents where on the x co-ordinate the vanes intersect this co-ordinate.

Figure 11A:
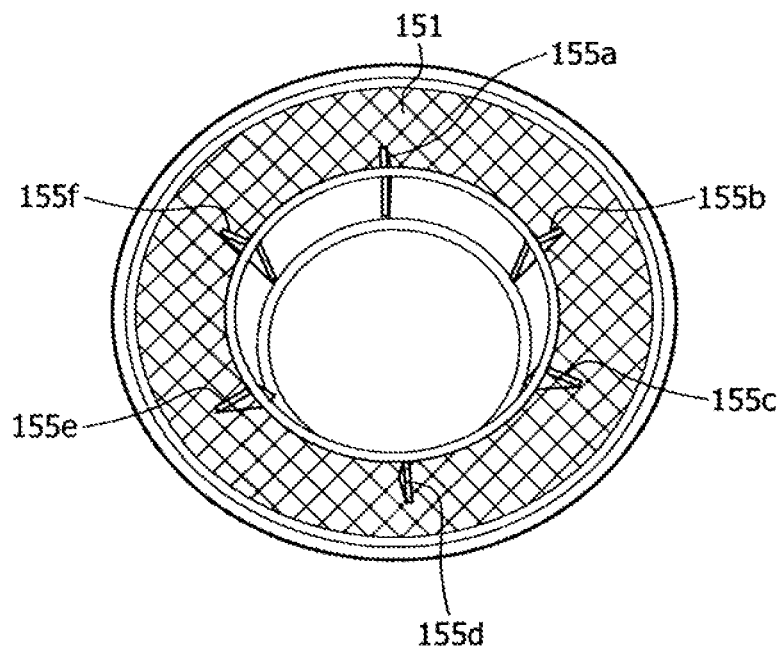
FIG. 11a and FIG. 11b illustrate an exemplary centrifugal bowl arrangement according to the present subject matter.
Figure 11B:
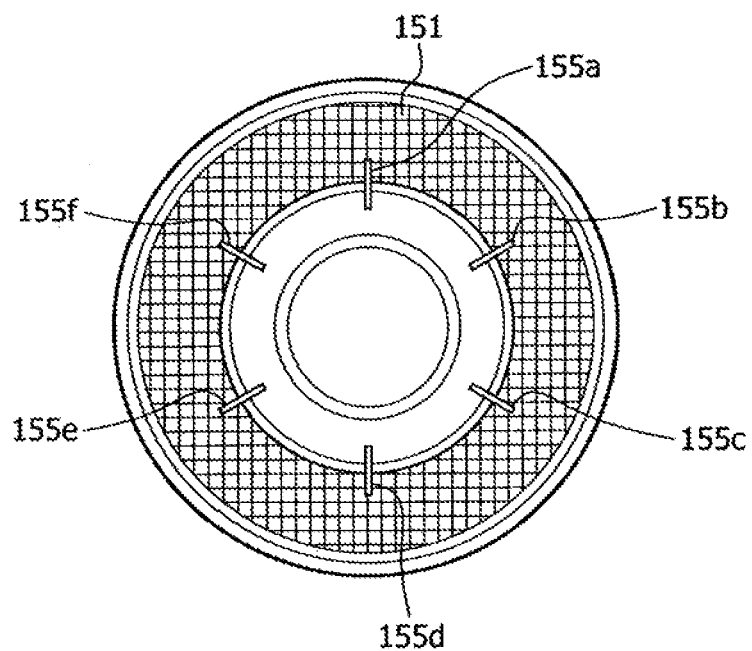

In an embodiment, the proposed design has 6 vanes, meaning that every 60 degrees a new vane will pass through (cf. FIG. 11a, 11b). There is a relation between the number of vanes, the size of the vanes, the vertical dispersion behavior and the desired catching efficiency. For the exemplary juicer illustrated in FIG. 1, six vanes work well. In some embodiments, 27 vanes (smaller in size) can be used which also works well and increase the catching efficiency. The horizontal line (cf. FIG. 5) represents the distance along the trajectory which coincides with the vane at its greatest radius. It is noted here that the size of the vanes, the shape of the vanes are chosen such that it results in good catching efficiency. Further, a radial rib construction acts as a radial flow pump. It pumps air. This air flow has sufficient force to blow the juice from the juice collector to the outlet.

A particle will fly along the trajectory coordinate too, and its path in the time-place diagram will be a straight line. It will have a slope that is indicative of its speed. Furthermore, particles can emanate from the feeding tube at random moments, so a particular particle with a certain speed can cross the horizontal line at any place, but will still have a specific slope, depending on its speed.

So, particles with velocity>64 mm/110 deg will be able to escape. All particles with a lower speed will be trapped by the vanes.

Assuming that the juicer runs at 100 rotations per second, the velocity becomes:

$$V=(64*10^{-3})/(110/(360*0.01))=21 \text{ m/sec}$$

Representing this velocity as critical velocity $v_c$, then it follows $$v_c = nf\sqrt{R^2-r^2}$$

Figure 6:
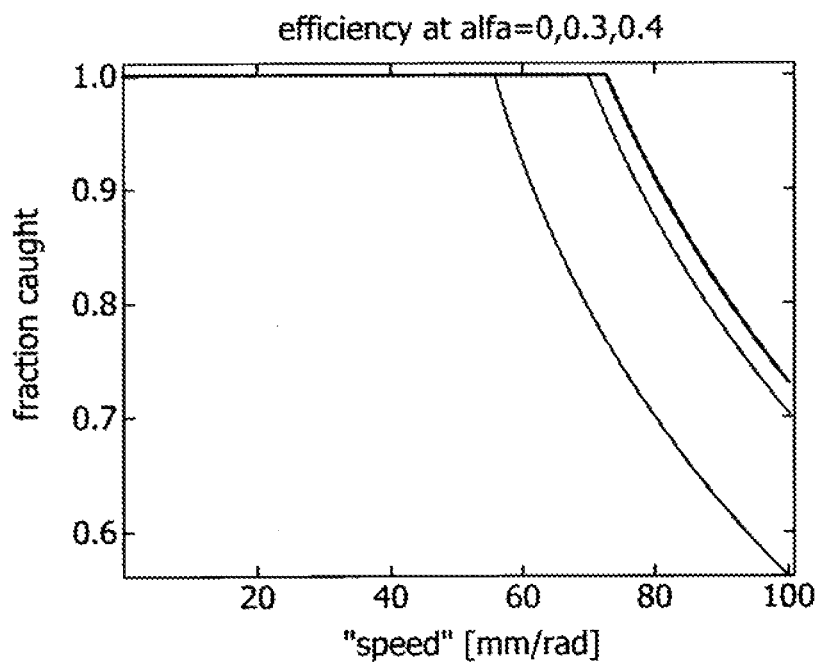
FIG. 6 schematically illustrates the catching efficiency.

Where
n: represents the number of equidistant vanes
f: represents the rotational frequency If particles are going faster than this critical speed, there will be a fraction of the particles caught. For a particular particle this depends on the time and velocity on the x-axis. This translates into straight line with a certain slope (==velocity) and start on the time axis (==timing). When the line crosses a vane, it will be caught, when it does not, it will be missed. This is illustrated schematically in FIG. 6 (based on the calculated results) depicting the efficiency at various values of α.

Figure 7:
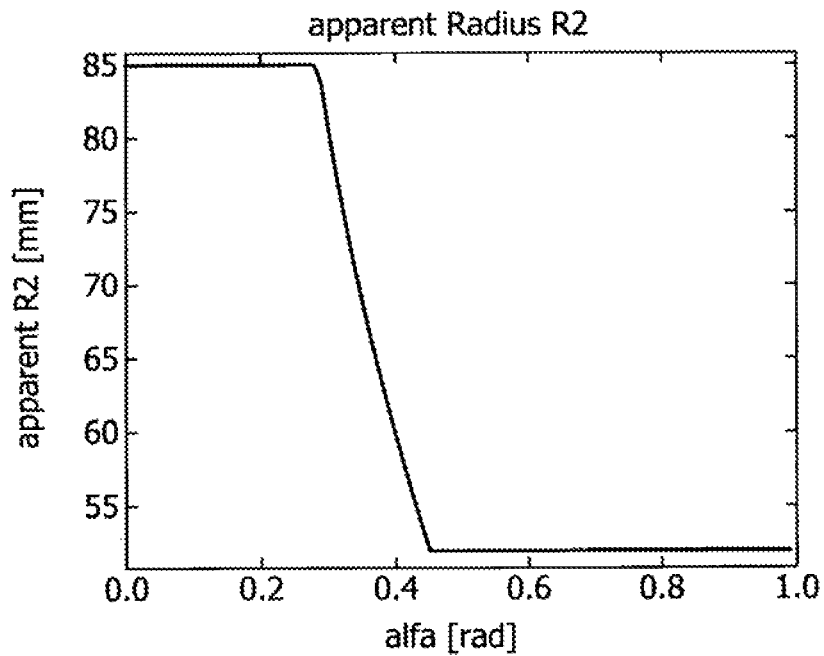
FIG. 7 schematically illustrates the variation of angle alpha with respect to the radius.

In an embodiment, the vanes are triangular in shape and more or less fill the space between the feeding tube (2) and the perforated peripheral side sieve wall. The triangular shape is chosen based on the directions of the perforated peripheral sieve wall and the vertical feeding tube. In order to catch the particles most efficiently, the vanes have to be close to the feeding tube and have to be connected to the perforated peripheral side sieve wall. The top side (3$^{rd}$ side of the triangle) can be chosen straight but can have any contour, thus generating different geometrical shapes compared to a triangle. The triangular vanes impose the angular velocity of the filter sieve upon the flying particles (i. e. the pulp and juice mixture). An unexpected effect is that the vanes also intercept the particles with a trajectory having an angle α greater than zero. When such a particle is trapped, it will cling to the vane and will glide radially with α=0 to the filter sieve, where the separation process will take place. A few geometrical considerations can be made on this such as when particles will be trapped and when they will be missed. Referring now to FIG. 7, when the angle α increases the apparent radius $R_2$ decreases, this is because the trajectory crosses the topside of the triangular vanes.

Figure 8:
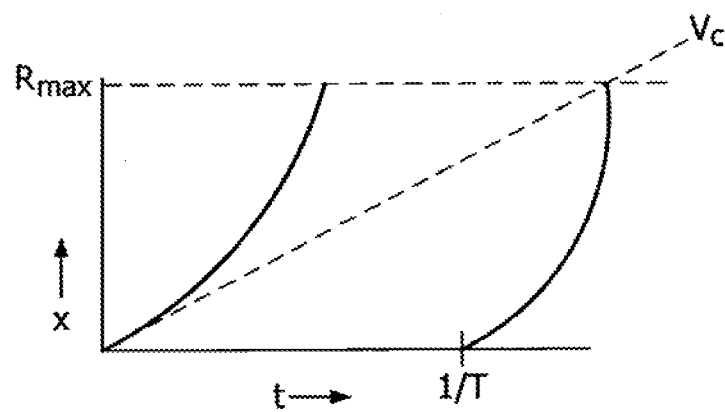
FIG. 8 and FIG. 9 schematically illustrate the critical velocity above which particles can escape.

Referring now to FIG. 8, with given r and $R_2$ there exists a certain velocity $v_c$, the critical velocity, above which particles can escape. This velocity depends also on the number of vanes. When one assumes that the maximum velocity equals the tangential velocity at radius r, then one can also calculate number of vanes, $R_2$ combinations.

$$v_c = \sqrt{R^2-r^2}/(1/6)T = \sqrt{R^2-r^2}nf$$

Assume $$v_c = wr$$

which implies $$wr = \sqrt{R^2-r^2}nf$$

$$2\pi r = \sqrt{R^2-r^2}n$$

$$2\pi = \sqrt{(R/r)^2-1}n$$

$$(2\pi/n)^2 = (R/r)^2-1$$

$$R = r\sqrt{1+(2\pi/n)^2}$$

Figure 9:
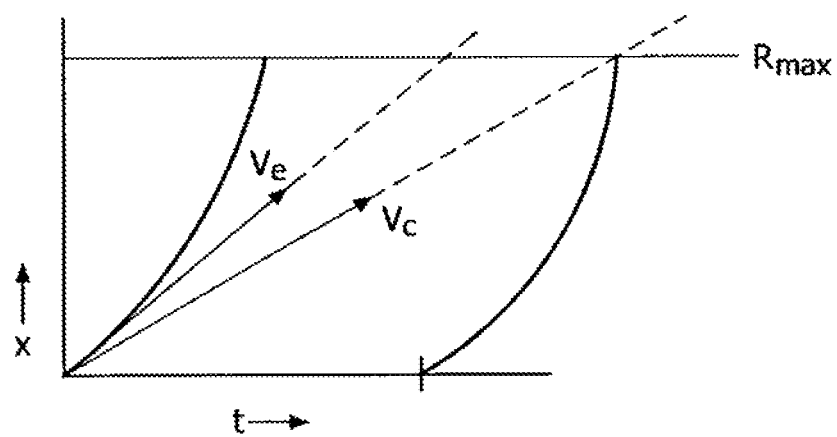
Figure 10:
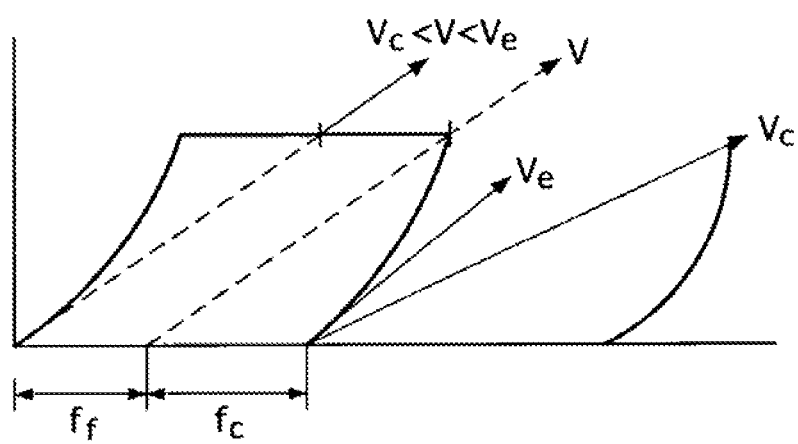

Referring now to FIG. 9 and FIG. 10, when the velocity is higher than the critical velocity, a certain fraction can escape. This fraction can be estimated for a given v, r and geometry. It is assumed that there is equal chance of particles leaving at a particular angle.

$v_c < v < v_e$: partly caught
$f_c$ (fraction caught) can be calculated from sketched geometry.
$v_e$: speed when other side of vane is hit $$v_e = dx/dt = d(r\tan(wt))/dt = w*r/\cos^2 wt = \omega*r \text{ at } t=0$$

In operation, the radial vanes provide sufficient force to blow the juice from the centrifugal filter sieve to the outlet, so as to prevent dripping and to provide additional forces to press the liquid out of the pulp.

Referring now to FIG. 11a and FIG. 11b, in an embodiment, the vanes are radially disposed on the inner surface of the peripheral side sieve wall and should not leak between the filter sieve and the vanes. This ensures that the entire pulp juice mixture is retained in the centrifugal bowl and minimizes the loss of pulp juice mixture due to leakage. Further, the juice output is increased.

Many other vane constructions are possible depending on the balance between the slip and centrifugal force that one wants. In an embodiment, the base 3 (i.e. the grating disk) is domed in construction having cutting teeth disposed on the inner side of the domed construction. The domed construction generates a vertically more dispersed pattern of pulp and juice mixture which can increase the juice output.

The disclosed centrifugal bowl prevents slippage of both fluid and pulp in the tangential direction. The disclosed centrifugal bowl arrangement increases the catching efficiency and separation efficiency which in turn increases the juice output. Further, the disclosed centrifugal bowl is simple in construction when compared to the double action sieve disclosed in WO2005110173, since there is no need to glue the sieves and balance the sieves since there is only one sieve.

In summary, the juice output of continuous centrifugal juicers can be increased by adding radial vanes on the inner surface of the perforated peripheral side sieve wall which is simple in construction.

The disclosed centrifugal bowl can be used in all devices where a fluid is to be exposed to a centrifugal force to force separation and transport over the filter sieve. It is also suitable for juice extractors that use the principle of centrifugal juicing. Although the disclosed centrifugal bowl is applicable to juicers, it may be applied to any food processing apparatus which extracts liquid from solids such as compacters, coffee machines, and foam generators. Further, many devices have internal fluid passages. Blowing through these passages is an effective means to make it dry again. In such cases, the disclosed centrifugal bowl can also be used e.g. in Perfect draft, Senseo, and kitchen appliances.

While the subject matter has been illustrated in detail in the drawings and foregoing description, such illustration and description are to be considered illustrative or exemplary and not restrictive; the subject matter is not limited to the disclosed embodiments. Other variations to the disclosed embodiments can be understood and effected by those skilled in the art of practicing the claimed subject matter, from a study of the drawings, the disclosure and the appended claims. Use of the verb "comprise" and its conjugates does not exclude the presence of elements other than those stated in a claim or in the description. Use of the indefinite article "a" or "an" preceding an element or step does not exclude the presence of a plurality of such elements or steps. A single unit may fulfill the functions of several items recited in the claims. The mere fact that certain measures are recited in mutually different dependent claims does not indicate that a combination of these measured cannot be used to advantage. The figures and description are to be regarded as illustrative only and do not limit the subject matter. Any reference sign in the claims should not be construed as limiting the scope.

The invention claimed is:

1. A centrifugal bowl comprising:
   a base configured to rotate about an axis of rotation, wherein the base includes a grating disk used to grate an object into a mixture of fluids and solids; and
   a filter sieve in the shape of a perforated peripheral side sieve wall coupled to the base, wherein the perforated peripheral side sieve wall extends from an open end of the filter sieve to the base, the filter sieve further including a plurality of vanes disposed in a predominantly radial direction on an inner surface of the perforated peripheral side sieve wall proximate the base, wherein each vane comprises a surface that pushes against the mixture to (i) increase centrifugal forces, giving rise to a coriolis effect, acting on the mixture and preventing slippage of the mixture in a rotational direction of the filter sieve, (ii) increase a separation efficiency of fluids from solids of the object and provide sufficient force to blow separated fluids from the perforated peripheral side sieve wall to an outlet and (iii) enhance a catching efficiency to counter spray of the mixture in a vertical direction.

2. The centrifugal bowl as claimed in claim 1, wherein each vane of the plurality of vanes comprises a shape that is triangular and more or less fills a space between a feeding tube and the perforated peripheral side sieve wall in response to placement of the feeding tube (i) through the open end of the filter sieve and (ii) proximate the base and the perforated peripheral side sieve wall to form an interstice with the base.

3. The centrifugal bowl as claimed in claim 1, wherein the plurality of vanes comprises six vanes.

4. The centrifugal bowl as claimed in claim 1, wherein each of the plurality of vanes is disposed on the inner surface of the perforated peripheral side sieve wall such that there is no leakage between the perforated peripheral side sieve wall and a respective vane.

5. The centrifugal bowl as claimed in claim 1, wherein the base is dome shaped and further includes cutting teeth disposed on a top surface of the base that corresponds to an inside of the dome.

6. A juicer comprising the centrifugal bowl as claimed in claim 1.

7. A method of improving the juice output of a juicer, comprising:
   providing the juicer with a centrifugal bowl that comprises (i) a base that can rotate about an axis of rotation, wherein the base includes a grating disk used to grate an object into a mixture of fluids and solids, and (ii) a filter sieve in the shape of a perforated peripheral side sieve wall coupled to the base such that the sieve wall extends from an open end of the filter sieve to the base; and
   preventing, via a plurality of vanes disposed on an inner surface of the perforated peripheral side sieve wall proximate the base of the centrifugal bowl, slippage of both fluids and solids in a tangential direction in response to rotation of the centrifugal bowl about the axis of rotation, wherein each vane comprises a surface that pushes against the mixture to (i) increase centrifugal forces, giving rise to a coriolis effect, acting on the mixture, (ii) increase a separation efficiency of fluids from solids of the object and provide sufficient force to blow separated fluids from the perforated peripheral side sieve wall to an outlet and (iii) enhance a catching efficiency to counter spray of the mixture in a vertical direction.

8. The method as claimed in claim 7, wherein preventing, via the plurality of vanes, comprises providing the plurality of vanes in a predominantly radial direction on the inner surface of the perforated peripheral side sieve wall proximate the base of the centrifugal bowl.

* * * * *